(12) United States Patent
Venkatesh et al.

(10) Patent No.: US 11,689,354 B2
(45) Date of Patent: Jun. 27, 2023

(54) EFFICIENT AND SCALABLE MECHANISM TO PROTECT INTEGRITY AND AUTHENTICITY OF LARGE DATA SETS IN CLOUD LOGGING ENVIRONMENTS

(71) Applicant: Oracle International Corporation, Redwood Shores, CA (US)

(72) Inventors: Karthik Venkatesh, Bothell, WA (US); Saikat Chakrabarti, Pueblo, CO (US); Pratibha Anjali Dohare, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 17/065,313

(22) Filed: Oct. 7, 2020

(65) Prior Publication Data

US 2022/0109557 A1    Apr. 7, 2022

(51) Int. Cl.
*H04L 9/06* (2006.01)
*H04L 9/08* (2006.01)
(Continued)

(52) U.S. Cl.
CPC .......... *H04L 9/0643* (2013.01); *H04L 9/0836* (2013.01); *H04L 9/30* (2013.01); *H04L 9/3247* (2013.01)

(58) Field of Classification Search
CPC ....... H04L 9/0643; H04L 9/0836; H04L 9/30; H04L 9/3247; H04L 2209/60; H04L 9/50
See application file for complete search history.

(56) References Cited

U.S. PATENT DOCUMENTS

| | | | |
|---|---|---|---|
| 6,928,548 B1 * | 8/2005 | Hale | G06F 21/79 713/187 |
| 8,793,499 B2 * | 7/2014 | Loughry | G06F 21/64 713/193 |

(Continued)

FOREIGN PATENT DOCUMENTS

WO   WO-2020025817 A1 *  2/2020

OTHER PUBLICATIONS

Di Ma; "Practical Forward Secure Sequential Aggregate Signature", Mar. 2008, ACM, pp. 341-352. (Year: 2008).*

(Continued)

*Primary Examiner* — Matthew Smithers
(74) *Attorney, Agent, or Firm* — Kilpatrick, Townsend & Stockton, LLP

(57) ABSTRACT

The present disclosure relates generally to systems and methods for content authentication. A method can include receiving from a sender system transmitted content (C) and appended content, the appended content including a digital signature associated with the content (C) and a hash tree ("SHT") associated with the content (C), generating with a signature engine a hash tree ("RHT") from the content (C), cryptographically verifying the received digital signature to generate a resultant hash value, comparing the resultant hash value to the second hash value of the second root node, determining that the second hash value of the second root node does not match the resultant hash value, identifying a potentially corrupted portion of content (C) via comparison of at least some of the plurality of first nodes of SHT to corresponding second nodes of RHT, and indicating that the digital signature could not be verified.

20 Claims, 13 Drawing Sheets

(51) Int. Cl.
    *H04L 9/30*     (2006.01)
    *H04L 9/32*     (2006.01)

(56) References Cited

U.S. PATENT DOCUMENTS

| | | | | |
|---|---|---|---|---|
| 10,726,000 | B1* | 7/2020 | Fortney | H04L 9/3239 |
| 11,138,214 | B2* | 10/2021 | Rosen | G06F 16/2465 |
| 2005/0234909 | A1* | 10/2005 | Bade | G06F 21/64 |
| 2009/0006853 | A1* | 1/2009 | Li | H04L 63/0428 |
| | | | | 713/176 |
| 2011/0283085 | A1* | 11/2011 | Dilger | G06F 11/1004 |
| | | | | 711/216 |
| 2014/0095512 | A1* | 4/2014 | Sun | G06F 16/3347 |
| | | | | 707/747 |
| 2014/0325644 | A1* | 10/2014 | Oberg | G06F 21/57 |
| | | | | 726/22 |
| 2017/0061131 | A1* | 3/2017 | Santos | H04L 63/123 |
| 2017/0163733 | A1* | 6/2017 | Grefen | H04L 67/53 |
| 2017/0345011 | A1* | 11/2017 | Salami | G06Q 20/42 |
| 2018/0013707 | A1* | 1/2018 | Murphy | H04L 51/212 |
| 2020/0127821 | A1* | 4/2020 | Dolev | H04L 9/085 |
| 2020/0151271 | A1* | 5/2020 | Mittelstadt | G06F 16/24568 |
| 2021/0075617 | A1* | 3/2021 | Irazabal | G06F 16/2462 |
| 2021/0081374 | A1* | 3/2021 | Shin | G06F 21/64 |
| 2022/0021542 | A1* | 1/2022 | Franklin | H04L 9/30 |

OTHER PUBLICATIONS

Kontak et al.; "Hashing Scheme for Space-efficient Detection and Localization of Changes in Large Data Sets", May 2012, MIPRO, pp. 1496-1501 (Year: 2012).*

Sivagnanam et al.; "Introducing the Open Science Chain—Protecting Integrity and Provenance of Research Data", 2019, ACM, pp. 1-5. (Year: 2019).*

Apolinario etal,; "S-Audit: Efficient Data Integrity Verification for Cloud Storage", 2018. IEEE, pp. 465-474. (Year: 2018).*

* cited by examiner

EFFICIENT AND SCALABLE MECHANISM TO PROTECT INTEGRITY AND AUTHENTICITY OF LARGE DATA SETS IN CLOUD LOGGING ENVIRONMENTS

TECHNICAL FIELD

The present disclosure relates generally to data transmission in and/or to a cloud network.

BACKGROUND

Management of large data sets presents both opportunities and challenges. These opportunities and challenges can arise in the context of data management and/or storage in the cloud, and specifically can arise in the context of cloud-based data logging, in other words, in the context of cloud-based collection and storing of data of a period of time.

Some of the challenges of data logging in the cloud include issues relating to scalability and data authentication. Previous attempts to address these challenges have focuses on hashing, signing, and verifying data sets being logged. However, these data sets can be very large, some being on the order of x-TBs. Due to their size, logging these data sets is extremely resource intensive. Ultimately, product teams having responsibility for logging data end up making decisions sacrificing security, in particular, authentication, owing to the amount of resources consumed by the logging of data sets.

There have been several attempts to address these conflicting needs for security and Current techniques to improve the balancing of security and resources include, for example: (1) use of a bi-directional authenticated channel to transmit logs and avoiding signing the data itself, and (2) incrementally hashing the logs before sending them to persistent storage. While these current techniques have provided benefits, they suffer from limitations, Accordingly, further developments to cloud-based data logging are desired.

BRIEF SUMMARY

The present disclosure relates generally to a method for content authentication. The method can include receiving at a recipient system from a sender system transmitted content (C) and appended content, the appended content including a digital signature associated with the content (C) and a hash tree ("SHT") associated with the content (C) and including a plurality of first nodes and a first root node, generating with a signature engine of the recipient system a hash tree ("RHT") from the content (C), the RHT including a plurality of second nodes and a second root node having a second hash value, cryptographically verifying the received digital signature to generate a resultant hash value, comparing the resultant hash value to the second hash value of the second root node, determining that the second hash value of the second root node does not match the resultant hash value, identifying a potentially corrupted portion of content (C) via comparison of at least some of the plurality of first nodes of SHT to corresponding second nodes of RHT, and indicating that the digital signature could not be verified.

In some embodiments, the signature engine includes an overlay subsystem and an underlay subsystem. In some embodiments, the overlay subsystem can generate the RHT, and the underlay subsystem can store the content (C). In some embodiments, the received digital signature is cryptographically verified with a public key of the sender. In some embodiments, the first root node includes a first hash value, and the resultant hash value matches to the first hash value.

In some embodiments, generating the RHT includes determining a block size for demarcation of content (C), and demarcating content (C) according to the determined block size. In some embodiments, demarcating content (C) according to the determined block size includes constructing a demarcation map comprising an array of values identifying a starting byte and an ending byte for each block of demarcated content (C).

In some embodiments, generating the RHT further includes computing a leaf hash value for each demarcated block of content (C). In some embodiments, computing the leaf hash value for each demarcated block of content (C) includes, for each demarcated block of content (C), selecting a demarcated block of content (C), identifying the first byte and the last byte in content (C) corresponding to the demarcated block of content (C), and generating a bitwise copy of the content (C) corresponding to the demarcated block of content (C). In some embodiments, computing the leaf hash value for each demarcated block of content (C) includes, for each demarcated block of content (C), applying a hash function to the bitwise copy of the content (C) corresponding to the demarcated block of content (C). In some embodiments, the output of the hash function applied to the bitwise copy of the content (C) corresponding to one of the demarcated blocks of content (C) is the leaf hash value of that one of the demarcated blocks of content (C).

In some embodiments, applying the hash function to the bitwise copy of the content (C) corresponding to the demarcated block of content (C) for each demarcated block of content (C) can be a single-threaded process. In some embodiments, the method includes applying a multithreaded process to applying the hash function to the bitwise copy of the content (C) corresponding to the demarcated block of content (C) for each demarcated block of content (C) when available memory is a multiple of block size. In some embodiments, the multiple is at least two. In some embodiments, applying the hash function to the bitwise copy of the content (C) corresponding to the demarcated block of content (C) for each demarcated block of content (C) can be a multi-threaded process. In some embodiments, the hash function is SHA256.

In some embodiments, generating the RHT includes iteratively identifying a pair of adjacent child nodes, concatenating the pair of child nodes, and applying the hash function to the concatenation of the pair of child nodes. In some embodiments, the pair of child nodes are leaf nodes, and in some embodiments, each of the leaf nodes can be one of the leaf hash values. In some embodiments, the method includes outputting information identifying portions of content (C) as potentially corrupted.

One aspect of the present disclosure relates to a non-transitory computer-readable storage medium storing a plurality of instructions executable by one or more processors. The plurality of instructions when executed by the one or more processors cause the one or more processors to receive at a recipient system from a sender system transmitted content (C) and appended content, the appended content including a digital signature associated with the content (C) and a hash tree ("SHT") associated with the content (C) and including a plurality of first nodes and a first root node, generate with a signature engine of the recipient system a hash tree ("RHT") from the content (C), RHT including a plurality of second nodes and a second root node having a second hash value, cryptographically verify the received digital signature to generate a resultant hash value, compare the resultant hash value to the second hash value of the second root node, determine that the second hash value of the second root node does not match the resultant hash value, identify a potentially corrupted portion of content (C) via comparison of at least some of the plurality of first nodes of SHT to corresponding second nodes of RHT, and indicate that the digital signature could not be verified.

One aspect of the present disclosure relates to a system for content authentication. The system includes a memory including a public key for cryptographically verifying a received digital signature, and a processor. The processor can receive transmitted content (C) and appended content, the appended content including a digital signature associated with the content (C) and a hash tree ("SHT") associated with the content (C) and including a plurality of first nodes and a first root node, generate with a signature engine a hash tree ("RHT") from the content (C), RHT including a plurality of second nodes and a second root node having a second hash value, cryptographically verify the received digital signature to generate a resultant hash value, compare the resultant hash value to the second hash value of the second root node, determine that the second hash value of the second root node does not match the resultant hash value, identify a potentially corrupted portion of content (C) via comparison of at least some of the plurality of first nodes of SHT to corresponding second nodes of RHT, and indicate that the digital signature could not be verified. In some embodiments, the received digital signature is cryptographically verified with the public key.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
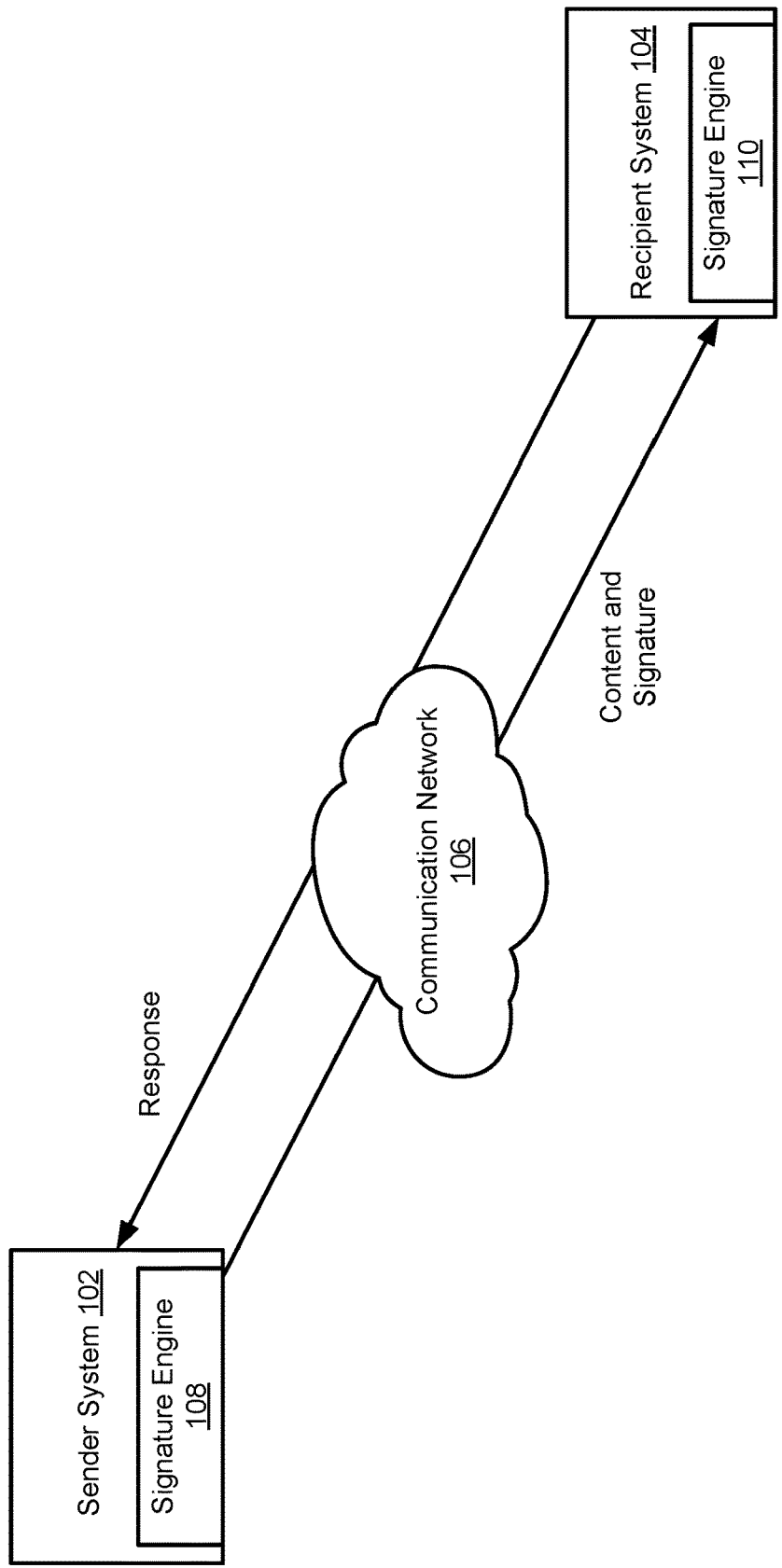
FIG. 1 depicts a simplified diagram of one embodiment of a system for providing data authentication.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Data and data management increasingly drive, or in some instances, limit development of new technologies and services. The importance of data is clearly seen in the context of Artificial Intelligence in the training of Artificial Intelligence models. While it is apparent that data is important, management of ever-increasing volumes of data creates challenges.

A cloud services provider (such as Oracle Corporation of Redwood Shores, Calif.) may provide one or more cloud services that can be subscribed to by customers (or subscribers) of the offered services. These services can include cloud-based data logging. This service can facilitate in gathering log data and the management of that log data.

As mentioned, authentication of logging data presents a significant challenge for cloud-based data logging services, specifically because of demands for scalability. At its core, this challenge is how to guarantee that the data sent by a source for logging is accurately stored, in other words, how to guarantee that the stored data matches the sent data. Guaranteeing the accuracy of stored data become particularly challenging due to varying amounts of data being stored. Specifically, the amount of data being stored at one time can be large or small, and thus, the technique used to authenticate the logging data should be scalable and able to deal with a range of amounts of data.

Some level of authentication of logging data can be provided by, for example, communicating the data via a mutually authenticated channel, increasing hardware size to match maximum expected traffic, and segmenting the data into small batches of data such as with the use of a block cipher. However, each of these solutions has drawbacks. For example, communicating data via a mutually authenticated channel only secures the channel via which the data is communicated and does not guarantee the accuracy of the received data. Increasing hardware size to match expected traffic can become expensive and inefficient and does not provide the ability to quickly adjust to variable system demands. Finally, segmenting the data into small batches necessitates acting on the data and includes the possibility of, through this segmenting, transforming the data.

Another technique for providing authentication is the use of a schema that uses incremental hashing, which involves the creation of a hash for a block of data and the modification of that hash as the block of data changes over time. However, incremental hashing only offers improved efficiency when the block of data has already been hashed and then gets slightly added upon, and not when the block of data is hashed for the first time.

In contrast to these techniques, the present disclosure relates to techniques to provide data authentication without the disadvantages of previous techniques. For example, the present disclosure relates to providing data authentication without affecting the data being transmitted, specifically, the data being transmitted is not altered, but rather is left in the same state in which it is received. Further, the present disclosure relates to providing data authentication with flexibility to accommodate different sizes of data being authenticated. Thus, the techniques of the present disclosure provide easy and efficient scalability.

With reference now to FIG. 1, a schematic illustration of one embodiment of a system 100 for providing data authentication is shown. The system 100 can include a sender system 102 coupled to a recipient system 104. The sender system 102 can be coupled to the recipient system 104 via one or several communication networks 106.

The sender system 102 can be implemented in hardware or software. In some embodiments, the sender system 102 can comprise one or several physical or virtual systems or machines. This can include, for example, one or several virtual machines, computers, processors, servers, or the like. This can include, for example, one or more integrated circuits (e.g., a conventional microprocessor or microcontroller), and/or one or more processors, including single core and/or multicore processors. In some embodiments, this can include, one or several servers such as one or several rack servers, blade servers, tower servers, mainframes, or the like.

The sender system 102 can receive data, also referred to herein as content (C) for providing to the recipient system 104. This data can be, in some embodiments, logging data. The sender system 102 can sign the data before transmitting this data to the recipient system 104. In some embodiments, the sender system can include a signature engine 108. The signature engine 108 can be embodied in hardware or software and can perform all or portions of the processes disclosed herein. In some embodiments, the signature engine 108 can demarcate the content (C), apply a hash function to the demarcated content (C), construct a hash tree (SHT) from the hashed content (C), and sign the content (C) based on all or portions of the hash tree (SHT).

The recipient system 104 can be implemented in hardware or software. In some embodiments, the recipient system 104 can comprise one or several physical or virtual systems or machines. This can include, for example, one or several virtual machines, computers, processors, servers, or the like. This can include, for example, one or more integrated circuits (e.g., a conventional microprocessor or microcontroller), and/or one or more processors, including single core and/or multicore processors. In some embodiments, this can include, one or several servers such as one or several rack servers, blade servers, tower servers, mainframes, or the like.

The recipient system 104 can receive the content (C) from the sender system 102, and in some embodiments can receive the content (C) from the signature engine 108 of the sender system 102. The content (C) received by the recipient system 104 can be signed, or in other words can be accompanied by a signature, and, in some embodiments, can be accompanied by the hash tree (SHT) generated by the sender system's 102 signature engine 108.

The recipient system 104 can include a signature engine 110 which can be embodied in hardware or software and can perform all or portions of the processes disclosed herein. In some embodiments, the signature engine 110 can include the same features and/or capabilities as the signature engine 108, and in some embodiments, the signature engine 110 can have different features and/or capabilities than the signature engine 108. The signature 110 can decrypt a received signature to thereby generate a resultant hash value, demarcate the content (C), apply a hash function to the demarcated content (C), construct a hash tree (RHT) from the hashed content (C), compare the resultant hash value to a hash value of a root node of the hash tree (RHT) to authenticate the received content (C), and can, in some embodiments, compare all or portions of the hash tree (RHT) to the hash tree (SHT) to identify one or several portions of content (C) as potentially corrupted. In some embodiments, the recipient system 104 can send a communication to the sender system 102 indicating when the content (C) is authenticated or indicating when the content (C) is not authenticated. In some embodiments, and when the content (C) is not authenticated, the recipient system 104 can provide identification of one or several portions of the content (C) as potentially corrupted, and/or identify one or several nodes of the hash tree (SHT) as not matching the hash tree (RHT).

The communication network 106 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network 106 may be local area networks (LAN), such as one based on Ethernet, Token-Ring and/or the like. Network(s) 106 also may be wide-area networks, such as the Internet. Networks 106 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 106.

Figure 2:
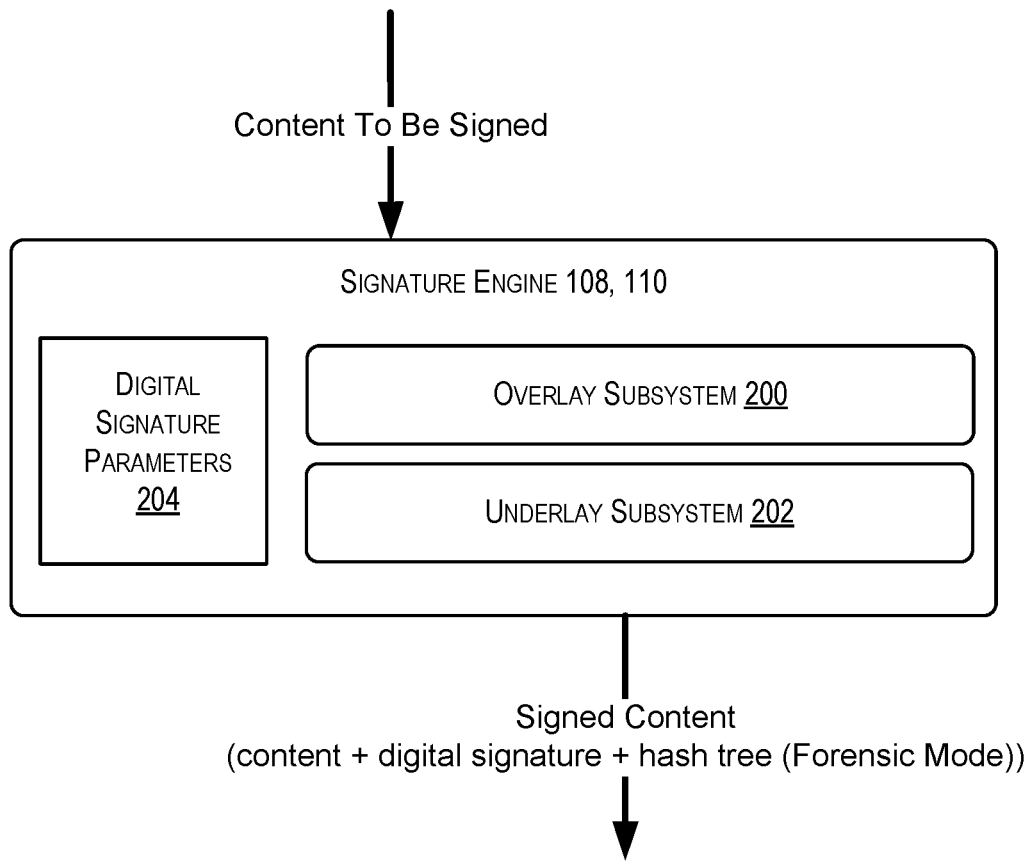
FIG. 2 is a schematic depiction of one embodiment of a signature engine.

With reference now to FIG. 2, a schematic illustration of one embodiment of the signature engine 108, 110 is shown. The signature engine 108, 110 can receive content (C) to be signed, and can output signed content which signed content can include the content (C) plus a digital signature. In some embodiments, when operating in forensic mode, the signature engine 108, 110 can output signed content including the content (C) plus the digital signature plus the hash tree (SHT) for the content (C). In some embodiments, the signature engine 108, 110 can receive the signed content, can decrypt the digital signature with a public key associated with the sender system 102 from which the signed content was received, generate a hash tree (RHT), and authenticate the decrypted digital signature based on a hash value of a root node of the hash tree (RHT).

A digital signature can be used to determine if contents of a message have been altered in transit. A sending device (also referred to herein as a sender device or sender system) can digitally sign a message by encrypting all or portions of the message content. This can occur via the application of a one-way hash to the message content to generate a hash value and the encryption of that hash value using a private key accessible by the sending device. The message and the digital signature (encrypted hash) are sent from the sender system to a recipient device (also referred to herein as a recipient system are receiving system). The recipient device can use a public key paired with the private key to decrypt the digital signature (encrypted hash) to obtain the hash value. This, now decrypted, hash value is compared to a hash value generated based on the received message. The hash value generated based on the received message is generated by applying the same one-way hash to the received message content as was applied to the message content to generate the, later encrypted, hash value. If a discrepancy between the hash values is identified, then the received message content is not authenticated and is different than the sent message content.

The signature engine 108, 100 can include an overlay subsystem 200 and an underlay subsystem 202. The underlay subsystem 202 can receive and store the content (C). The underlay subsystem 202 of one signature engine 108, 110 can transmit the content (C) to another signature engine 108, 110. The overlay subsystem 200 evaluates the content (C), demarcates the content (C), hashes the demarcated content (C), creates a hash tree (SHT, RHT), signs the content (C), compares all or portions of hash tree (SHT) to hash tree (RHT), and/or decrypts the signed content (C). In some embodiments, the overlay subsystem 200 can generate a hash tree (SHT, RHT), and the underlay system is configured to store content (C).

The overlay subsystem 200 can generate the digital signature and/or decrypt the digital signature based on digital signature parameters contained in a digital signature parameter store 204, which store can be, for example, a memory. These digital signature parameters can include, for example, one or several keys such as, for example, a sender system's 102 private key, a sender system's 102 public-key, or the like. In some embodiments, the digital signature parameters can include information used in determining block size for demarcating content (C), a demarcation map tracking demarcation of content (C), a hash value for each block of the demarcated content (C), a hash tree, a hash value of a root node of the hash tree, and a signed a value generated by the application of the sender system's 102 private key to the hash value of the root node of the hash tree.

In some embodiments, by separating the overlay subsystem 200 and the underlay subsystem 202, the integrity of content (C) can be protected. Specifically, all operations are performed in the overlay subsystem 202 not change or affect content (C). In some embodiments, for example, when the overlay subsystem 200 hashes the content block, the hash content block is a copy, and specifically is a bitwise copy of a portion of content (C), and thus this hashing does not affect content (C).

Figure 3:
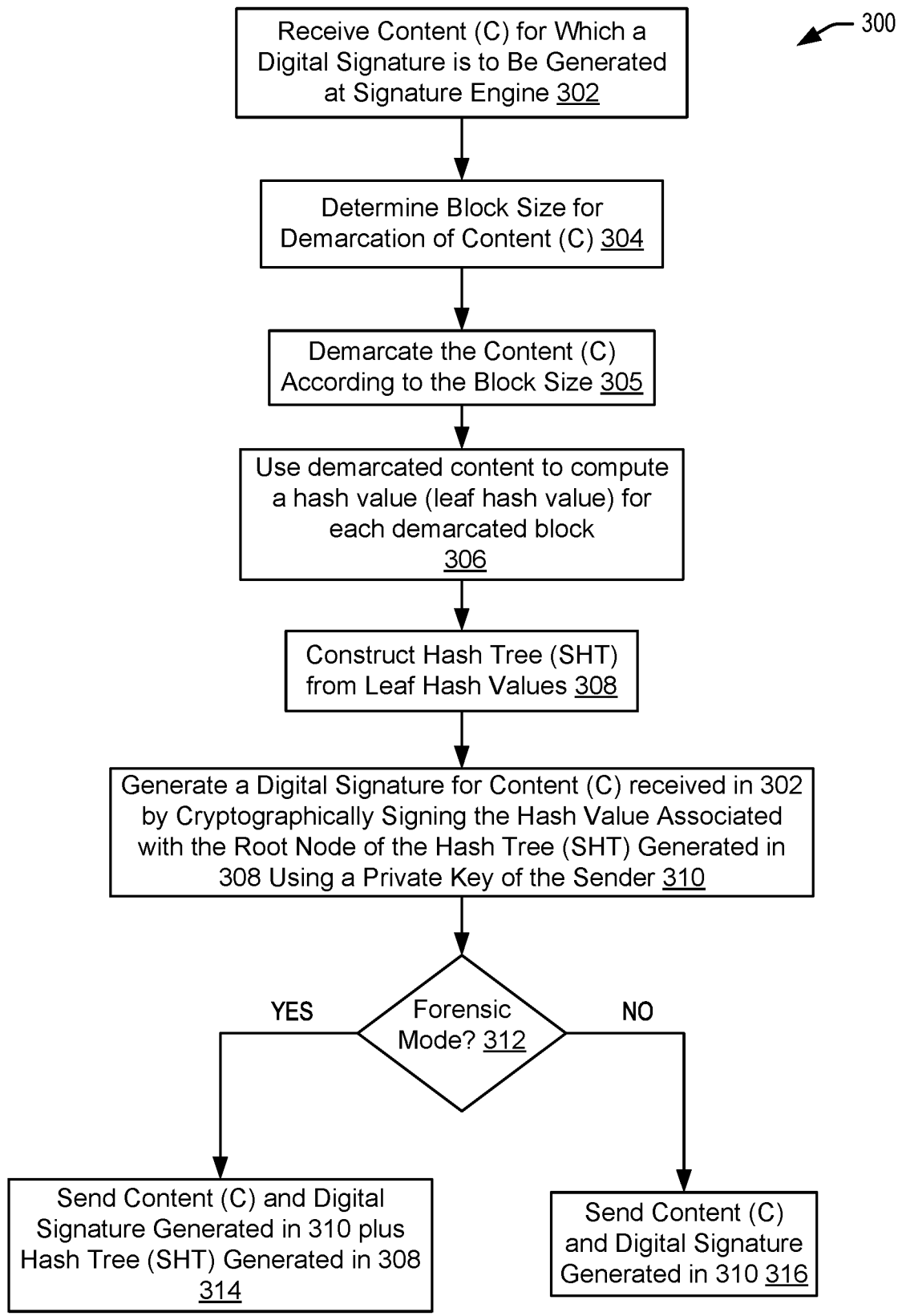
FIG. 3 is a flowchart illustrating one embodiment of a process sending signed content.

With reference now to FIG. 3, a flowchart illustrating one embodiment of a process 300 for sending signed content (C) is shown. The process 300 can be performed by the system 100 and specifically can be performed by the sender system 102 and/or the recipient system 104. In some embodiments, the process 300 can be performed by the signature engine 108 of the sender system 102 and/or can be performed by the signature engine 110 of the recipient system 104. When performed by the sender system 102 and/or the signature engine 108 of the sender system 102, some or all of the steps 302 three 316 can be performed. In contrast to that, when the process 300 is performed by the recipient system 104 and/or the signature engine 110 of the recipient system 104, some or all of steps 304 through 308 can be performed. Also when the process 300 is performed by the recipient system 104 and/or the signature engine 110 of the recipient system 104, the hash tree generated in block 308 is hash tree (RHT).

The process 300 begins at block 302, wherein content (C) is received. The content (C) can be received by the sender system 102, and specifically can be received by the signature engine 108 of the sender system 102. The content (C) can be data for which a digital signature is to be generated by the signature engine 108. At block 304, block size for demarcation of content (C) is determined. In some embodiments, this block size can be determined based on one or several attributes of the sender system 102 and/or of the signature engine 108 of the sender system 102. In some embodiments, for example the overlay subsystem 200 can determine one or several attributes and/or settings to determine the block size. In some embodiments, for example, the overlay subsystem 200 can identify and read one or several user-configured settings objects. These settings objects can be, in some embodiments, derived from one or several files or injected via consumer code. The overlay subsystem 200 can further communicate with the sending system 102, and specifically with the operating system of the sending system 102 and/or with the signature engine 108 to determine current RAM memory utilization and system information. In some embodiments, the overlay subsystem 200 can determine one or several of: a memory usage lower bound; a memory usage upper bound; an operating mode (e.g. forensic or non-forensic); and whether the overlay subsystem 200 can scale operations based on memory availability (e.g. increasing or decreasing the number of threads as memory resources change).

In some embodiments, the block size can be determined based on available memory resources. For example, in some embodiments the overlay subsystem 200 can determine block size based on the memory usage lower bound. In some embodiments, for example, the block size is set at the memory usage lower bound or at some fraction of the memory usage lower bound.

At block 305, the content (C) is demarcated according to the block size determined in block 300 for. In some embodiments, the content (C) can be demarcated by the signature engine 108. In some embodiments, this can include the creation of a demarcation map (P). The demarcation map (P) can comprise an array of values that are each associated with a portion of the content (C). Specifically, the array of values can comprise a plurality of pairs of values, each of the pairs of values comprising a first value identifying a starting byte in a block of data of content (C), and the second value identifying and ending by in the block of data of content (C). In some embodiments, the creation of the demarcation map can include generating a pad that has a size such that the size of the content (C)+pad is an integer multiple of the block size determined at block 300 for. Content (C) can be adjusted to be equal to the size of content (C)+pad. The content (C) is then divided equally into n blocks, each having the block size determined in block 304. For each block i of the n blocks, $P_i$=[starting byte, ending byte] of corresponding $C_i$. Once $P_i$ has been determined for each of the end blocks, then the array, or in other words demarcation map (P) is formed, wherein $P=P_1\|P_2 \ldots \|P_n$ such that each $P_i$ now has the corresponding starting and ending bytes of $M_i$. The demarcation map (P) is then stored in, for example, the signature engine 108, 110, and specifically can be stored with the digital signature parameters store 204. Upon generation of the demarcation map (P), content (C) is represented in the underlay subsystem 202 as $C_1\|C_2\| \ldots \|C_n$ where n is the number of blocks.

At block 306 the demarcated content is used in computing a hash value (leaf hash value) for each block of the demarcated content (C). This can result in the creation of a leaf node for each block of the demarcated content (C), each leaf node having the leaf hash value generated from its associated block of demarcated content (C). In some embodiments, this can include the generation of a digest map (D), is represented as $D_1\|D2\|\ldots\|Dn$ where n is the same number of blocks as in the demarcation map, and each block Di represents the digest, or in other words, the hash value of $C_i$, as mapped via $P_i$. In some embodiments, computing the leaf hash value for each demarcated block of content (C) can include selecting a demarcated block of content (C), identifying the first byte and the last byte in content (C) corresponding to the demarcated block of content (C), and generating a bitwise copy of the content (C) corresponding to the demarcated block of content (C).

In some embodiments, computing the leaf hash value for each demarcated block of content (C) can further include, for each demarcated block of content (C), applying a hash function to the bitwise copy of the content (C) corresponding to the demarcated block of content (C). In some embodiments, the output of the hash function applied to the bitwise copy of the content (C) corresponding to one of the demarcated blocks of content (C) is the leaf hash value of that one of the demarcated blocks of content (C). In some embodiments, the hash function can comprise a cryptographic hash function and/or a trapdoor function. In some embodiments, the hash function can comprise SHA-256.

In one embodiment, the construction of the digest map can include the following:
Input: Content (C), demarcation map (P)
Output: Digest map (D)
For each block i:
   a. overlay creates empty bit vector $V_i$ of size size ($C_i$)
   b. $V_i$ is a bitwise copy of $C_i$ (inherently non-blocking and thread safe, since these are only reads)
   c. overlay spawns a thread that performs
     i. $D_i$=fn($V_i$) where fn is the trapdoor function. (The trapdoor fn defaults to SHA256, but can be overriden with user configuration)
     ii. Size($D_i$)=32 bytes (based on SHA256)
     iii. Return $D_i$
   d. Return D Through the use of a multithreaded process, the overlay subsystem 200 in addition to shepherding the construction of the digest map, is also able to scale the creation of the digest map to fit available memory. For instance, if available memory is at least a multiple of block size, and if that available memory is within the memory usage upper bound, then the overlay subsystem 200 is able spawn another thread to address a currently unaddressed block of content (C). The converse is also true, where the overlay subsystem 200 is able to throttle, or even block a thread should available memory fall below the lower bound usable memory.

In some embodiments, applying the past function to the bitwise copy of the content (C) corresponding to the demarcated block of content (C) can be a single threaded process or can be a multi-threaded process. In some embodiments, computing the leaf hash value for each demarcated block of content (C) can include using a multithreaded process for applying the hash function to the bitwise copy of the content (C) corresponding to the demarcated block of content (C) for each demarcated block of content (C) when available memory is a multiple of block size. In some embodiments, this multithreaded process can be applied when the available memory is a multiple of the block size determined in block 304, and when this multiple is at least two.

At block 308 a hash tree is constructed. In some embodiments, the hash tree can be a Merkle tree. In some embodiments, this can include constructing a hash tree from the leaf hash values computed in block 306. In embodiments in which block 308 is performed by the sending system 102, the constructed hash tree can be hash tree (SHT), whereas in embodiments in which block 308 is performed by the receiving system 104, the constructed hash tree can be hash tree (RHT).

In some embodiments, constructing the hash tree from the leaf hash values can include identifying a pair of adjacent child nodes. In some embodiments these child nodes can be leaf nodes, and in some embodiments, these child nodes can be any other nodes in the hash tree being combined to create a new parent node. For example, in some embodiments, these nodes can be parent nodes created from the combination of leaf nodes or the combination of parent nodes created by the combination of leaf nodes.

The identified pair of child nodes can then be concatenated together, and the hash function can then be applied to the concatenation of the pair of child nodes to generate a hash value for that new node. This hash function can be the same hash function applied to the blocks of demarcated content to generate leaf hash values.

Figure 4:
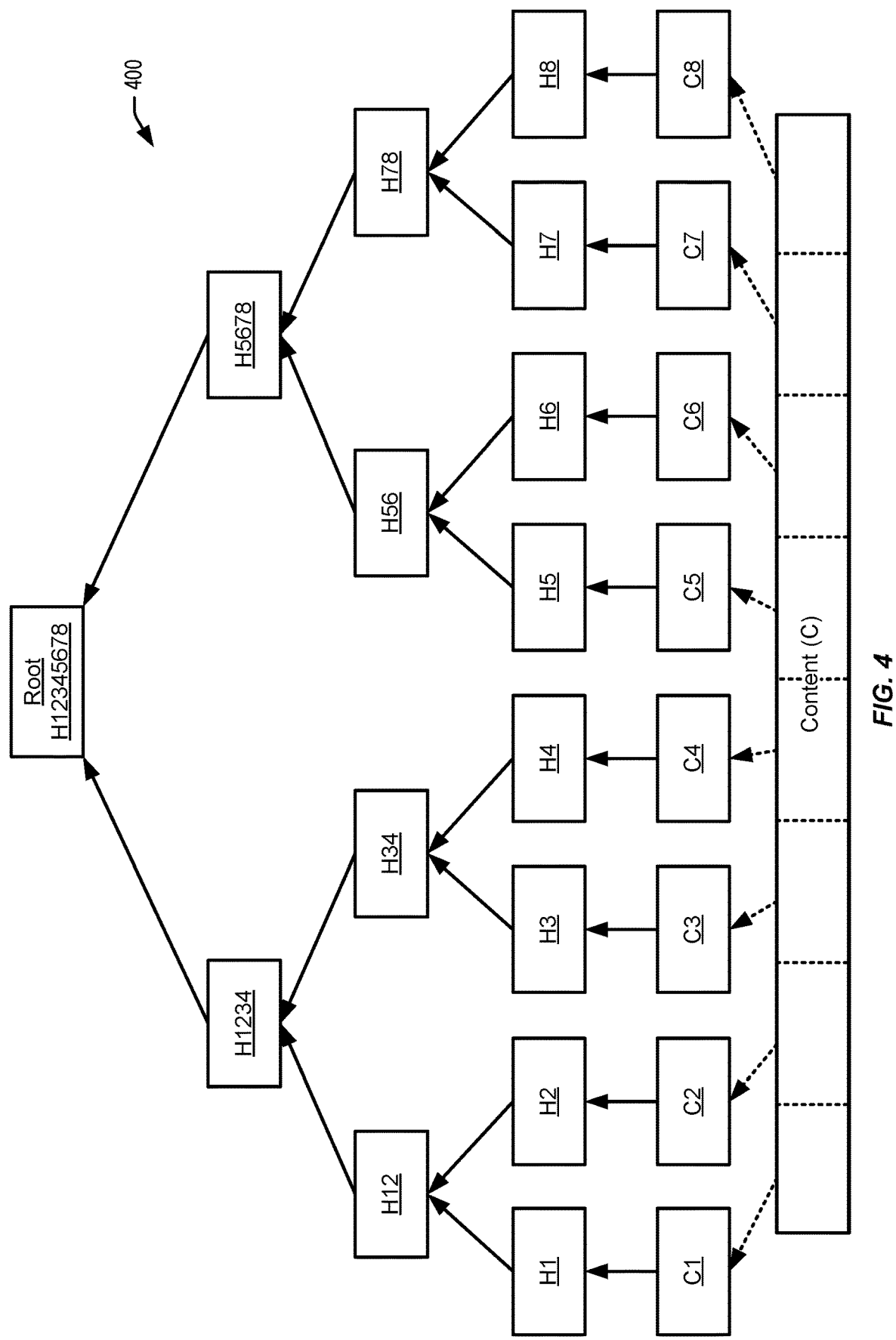
FIG. 4 is a depiction of one embodiment of a hash tree.

In some embodiments, the hash tree can be generated as follows:
Input: Digest map D
Output: Hash tree RHT, SHT (In the example below, SHT can be replaced with RHT to create hash tree RHT)
1. For each block i in D:
   a. $SHT_{0,i}=D_i$
2. k=0
3. while size($SHT_k$)>1:
   a. for each i,i+1 in size($SHT_k$):
     i. $SHT_{k+1,i}$=fn($SHT_{k,i}\|SHT_{k,i+1}$)
4. In essence, a binary tree is constructed such that each leaf node is the hash or the corresponding message block (or $M_i$), and every parent is the hash of the concatenation of its two children. The hash is built up till the root, or the single super-parent is obtained.
Return SHT With reference now to FIG. 4, one embodiment of a hash tree 400 is shown. As seen in FIG. 4, content (C) is partitioned into eight pieces, shown by dotted lines in rectangle labeled Content (C) and shown in rectangles C1 through C8. Rectangles C1 through C8 each represent one block of content to which the hash function is applied to generate leaf nodes H1 through H8. Leaf nodes are pairwise concatenated and hashed to form parent nodes. For example, leaf nodes H1 and H2 are concatenated and hashed to form node H12, leaf nodes H3 and H4 are concatenated and hashed to form node H34, leaf nodes H5 and H6 are concatenated and hashed to form node H56, and leaf nodes H7 and H8 are concatenated and hash to form node H78. Nodes in this next level formed by the concatenation and hashing of leaf nodes, in other words nodes H12 through H78 are then pairwise concatenated and hashed to form further parent nodes. Thus, for example, nodes H13 and H34 are concatenated and hashed to form node H1234, and nodes H56 and H78 are concatenated and hashed to form node H5678. Nodes in this next level formed by the concatenation and hashing of nodes H12 through H78 are then pairwise concatenated and hashed. In other words, nodes H1234 and H5678 are concatenated and hashed to form node H12345678, which is the root node of the hash tree 400.

Once the hash tree has been generated, the process 300 proceeds to block 310, wherein a digital signature for content (C) received in block 302 is generated. In some embodiments, this digital signature is generated by identifying a rood node of the hash tree (SHT), retrieving the hash value associated with the root node of the hash tree (SHT), and cryptographically sign the hash value. In some embodiments, the hash value of the root node of the hash tree (SHT) can be cryptographically signed using a private key of the sender 102. The digital signature can be generated by the signature engine 108.

Returning again to FIG. 3, at decision step 312 it is determined if forensic mode has been selected. In some embodiments, this determination can be made based on information gathered by the overlay subsystem 200 at block 304. If it is determined that forensic mode has been selected, then the process 300 proceeds to block 314 wherein the content (C) and the digital signature generated in block 310 and the hash tree (SHT) generated in block 308 are transmitted. In some embodiments, the content (C), the digital signature generated in block 310, and the hash tree (SHT) generated in block 308 are transmitted to the recipient system 104 via the communication network 106.

Returning again to decision step 312, if it is determined that forensic mode has not been selected, then the process 300 proceeds to block 316 wherein the content (C) and the digital signature generated in block 310 are transmitted. In some embodiments, the content (C) and the digital signature generated in block 310 are transmitted to the recipient system 104 via the communication network 106. Thus, when forensic mode is not selected, the content (C) and the digital signature are transmitted, and when forensic mode is selected, the content (C), the digital signature, and the hash tree (SHT) are transmitted.

Figure 5:
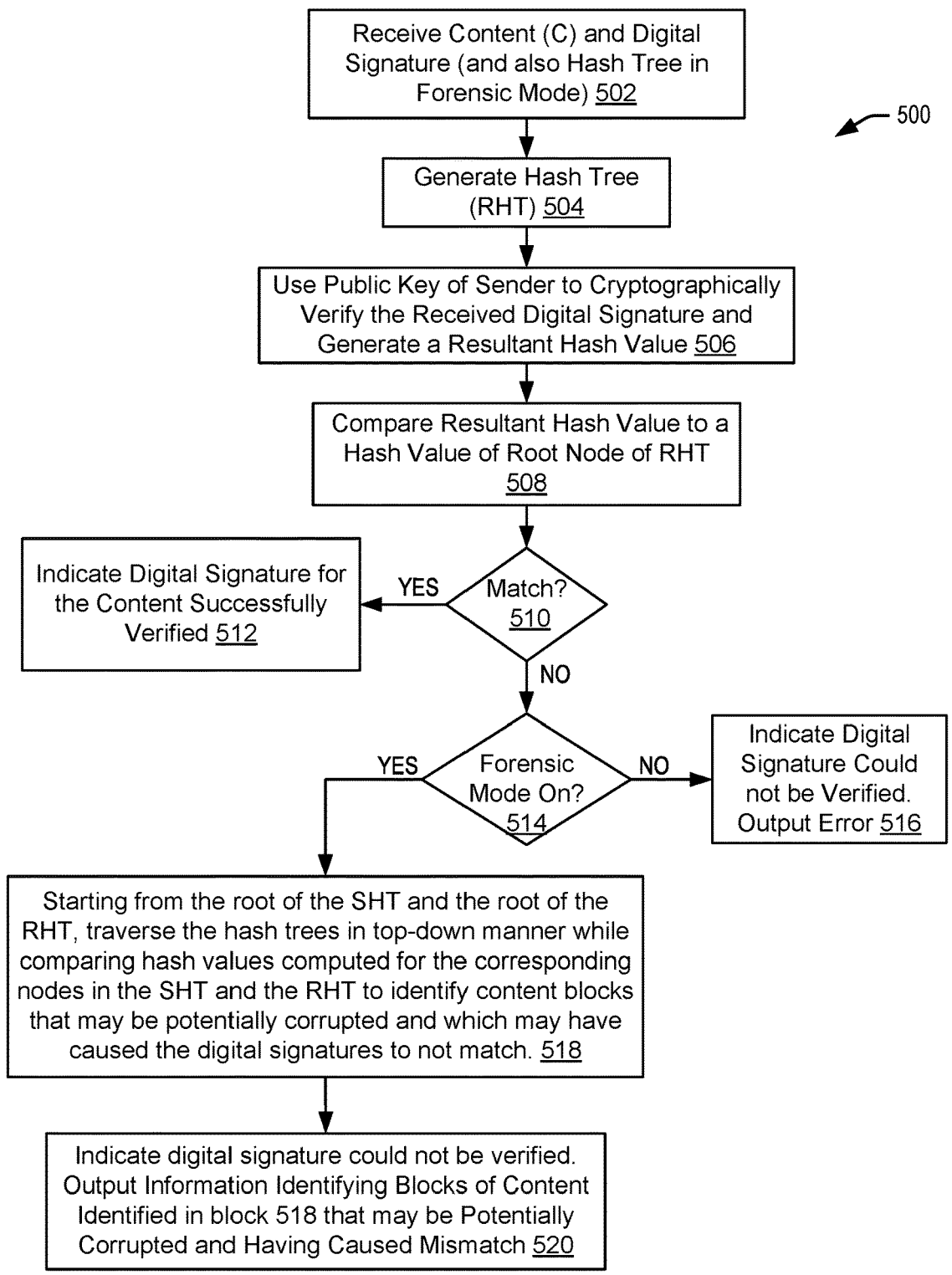
FIG. 5 is a flowchart illustrating one embodiment of a process for content authentication.

With reference now to FIG. 5, a flowchart illustrating one embodiment of a process 500 for content (C) authentication is shown. The process can be performed by the recipient system 104, and specifically by the signature engine 110 of the recipient system 104. The process 500 begins at block 502 wherein content (C) is received by the recipient system 104, and specifically by the signature engine 110 of the recipient system 104. The content (C) can be accompanied by the digital signature, and in embodiments in which forensic mode has been selected, the content (C) can be accompanied by the hash tree (SHT). Thus, in some embodiments the recipient system 104 can receive the transmitted content (C) and appended content, which appended content can include the digital signature, and in some embodiments, hash tree (SHT) can comprise a plurality of first nodes which can include a first root node which can have a first hash value. In embodiments in which forensic mode is not selected, the digital signature accompanying content (C) can be generated based on the first hash value.

At block 500 for hash tree (RHT) is generated. In some embodiments, hash tree (RHT) can be generated by the signature engine 110 of the recipient system. In some embodiments, the signature engine 110 can perform steps 304 through 308 of process 300 to generate hash tree (RHT). In some embodiments, generating hash tree (RHT) can include determining a block size, demarcating content (C) according to the determined block size, computing a leaf hash value for each block of demarcated content (C), and constructing hash tree (RHT) from these leaf hash values. In some embodiments, determining the block size can include determining the block size used by the sending system 102, and specifically by the signature engine 108 of the sending system 102. In some embodiments, information identifying the block size can be transmitted from the sending system 102 to the recipient system 104, and in some embodiments, this information can accompany content (C). Hash tree (RHT) can include, for example, a plurality of second nodes and a second root node which can have a second hash value.

At block 506 the received digital signature is cryptographically verified by the signature engine 110 of the recipient system 104. In some embodiments, the digital signature is cryptographically verified the use of the public key of the sender 102 to thereby generate a resultant hash value. This resultant hash value can be equal to the first hash value. This public key can, in some embodiments, be made available to the signature engine 110 by the sending system 102 and/or by the signature engine 108 of the sending system 102. The signature engine 110 can then compare the resultant hash value generated in block 506 to the second hash value of the second root node of hash tree (RHT). At decision step 510, it is determined if the resultant hash value matches the second hash value. In some embodiments, this determination is made based on the results of the comparison of block 508. If it is determined that the resultant hash value matches the second hash value, then the process 500 proceeds to block 512 wherein the signature engine 110 and/or the recipient system 104 indicates that the digital signature for content (C) was successfully verified and/or authenticated. In some embodiments, this can include transmitting a message from the recipient system 104 to the sending system 102 indicating that the digital signature for content (C) was verified, and thus that content (C) was verified.

Returning again to decision step 510, if it is determined that the resultant hash value and the second hash value do not match, then the process 500 proceeds to decision step 514, wherein it is determined if the forensic mode is selected. In some embodiments, this determination can be made by determining if the hash tree (SHT) was transmitted with content (C). If it is determined that the forensic mode is not selected, then the process 500 proceeds to block 516 wherein the signature engine 110 and/or the recipient system 104 indicates that the digital signature for content (C) could not be verified and/or authenticated. In some embodiments, this can include transmitting a message from the recipient system 104 to the sending system 102 indicating that the digital signature for content (C) was not verified, and thus that content (C) was not verified.

Returning again to decision state 514, if it is determined that the forensic mode is selected, then the process 500 proceeds to block 518, wherein one or several blocks and/or portions of content (C) are identified as potentially corrupted via comparison of some or all of the first nodes of SHT to the second nodes of RHT. In some embodiments, this can include traversing the hash trees (SHT, RHT) and comparing the hash values of corresponding nodes within the hash trees (SHT, RHT). This can include, for example, starting from the root node of SHT and the root node of RHT and traversing the hash trees (SHT, RHT) in top-down manner while comparing hash values computed for the corresponding nodes in SHT and RHT to identify mismatches between nodes. After mismatched nodes within a level of the hash trees (SHT, RHT) have been identified, one or several subtrees of child nodes of those mismatched nodes can be identified. If desired, these one or several subtrees can be traversed to identify mismatched nodes within those one or several subtrees. In some embodiments, this can include dropping a level within the a subtree, and comparing the hash values of corresponding nodes in SHT and RHT and identifying mismatch nodes. Based on identified mismatch nodes, new subtrees can be identified, and, in some embodiments, the process can be repeated until one or several mismatched leaf nodes are identified. By identifying mismatched leaf nodes, the associated content blocks of content (C) can be identified as potentially corrupted and/or as creating the mismatch.

In some embodiments, by identifying subtrees of mismatched nodes and then evaluating those subtrees, the process of identifying corrupted data can be accelerated. Specifically, by creating and evaluating progressively more focused subtrees, the amount of data to be evaluated to identify the corrupted data can be significantly truncated, thereby decreasing the amount of time taken to identify the corrupted data.

In some embodiments, the identification of one or several blocks and/or portions of content (C) as potentially corrupted can include:

If SHT(root)!=RHT(root)
   a. For each level 1 in hash tree:
      i. For each node i in 1:
         1. If $SHT_{1,i}$!=$RHT_{1,i}$ then topmost_mangled_level=1; return $RHT_{1,i}$
   b. The user can then further analyze or perform forensics on the subtree starting from $RHT_{1,i}$ and the corresponding leaf nodes, which in turn map to message blocks The process can then proceed to block 520 wherein an indication that the signature could not be verified and/or authenticated is provided. In some embodiments, this can include the signature engine 110 and/or the recipient system 104 indicating that the digital signature for content (C) could not be verified and/or authenticated. In some embodiments, this can include transmitting a message from the recipient system 104 to the sending system 102 indicating that the digital signature for content (C) was not verified, and thus that content (C) was not verified. In some embodiments, this can further include outputting information identifying one or several blocks of content and/or portions of content (C) identified in step 518 that may be potentially corrupted and/or may have caused the mismatch.

Figure 6:
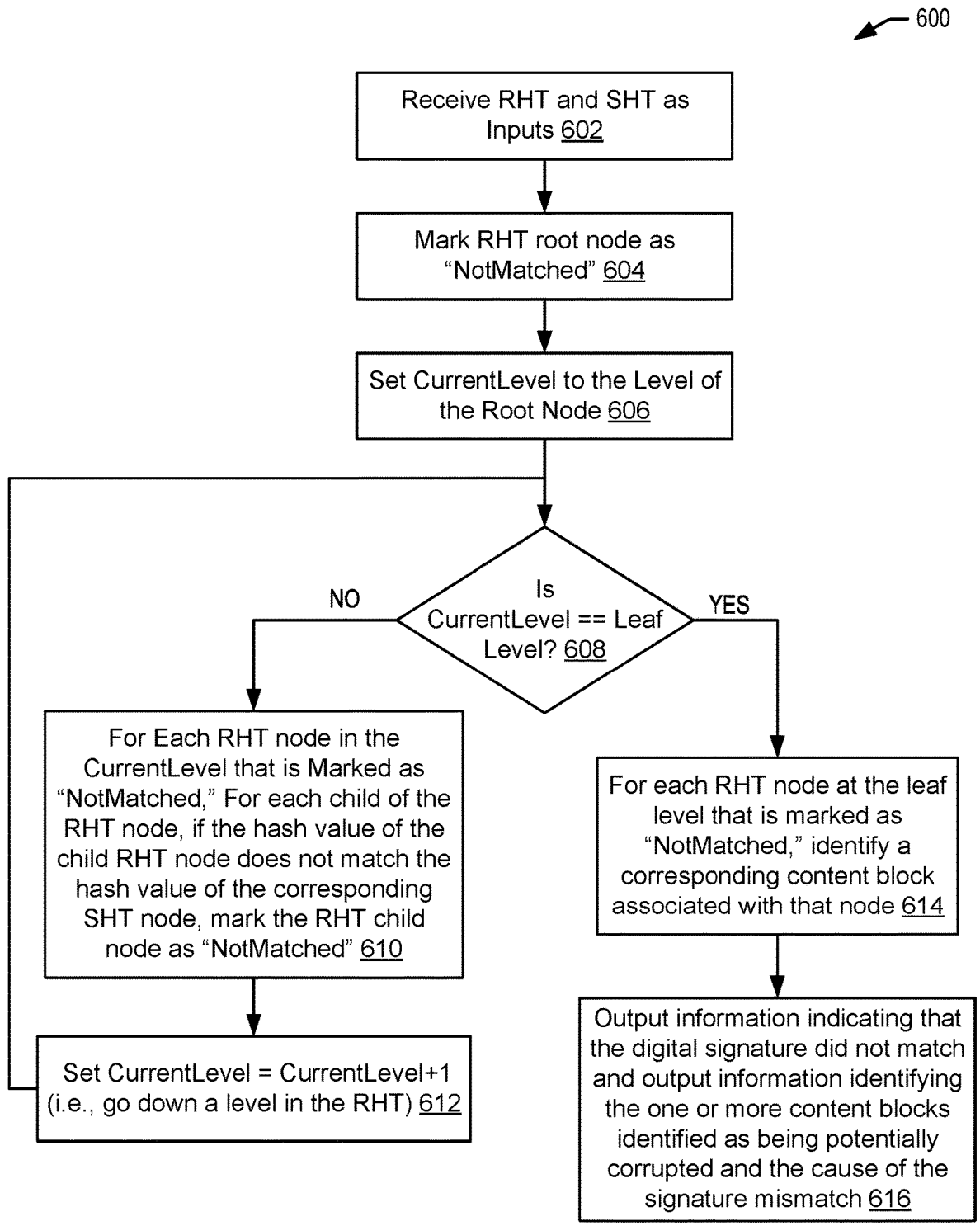
FIG. 6 is a flowchart illustrating one embodiment of a process for comparing hash tree SHT and has tree RHT.

With reference now to FIG. 6, a flowchart illustrating one embodiment of a process 600 for comparing SHT and RHT is shown. The process 600 can be performed by the recipient system 104, and specifically by the signature engine 110 of the recipient system 104. The process 600 begins at block 602 wherein SHT and RHT are received as inputs. In some embodiments, SHT and RHT are received as inputs by the signature engine 110 of the recipient system 104. Starting at the root nodes and traversing the trees (SHT, RHT) in a top-down manner, the RHT root node is marked and/or identified as "NotMatched."

The process 600 then proceeds to block 606 wherein CurrentLevel is set to the level of the root node the root node. The process 600 then proceeds to decision step 608 wherein it is determined if CurrentLevel is equal to a leaf level, or in other words if CurrentLevel is the level of the leaf nodes of RHT. If CurrentLevel is not equal to the leaf level, then the process 600 proceeds to block 610 wherein each child node of each RHT node in the CurrentLevel that is marked as "NotMatched" is a compared to a corresponding SHT node. This comparison includes comparing the hash value of each child node of each RHT node in the CurrentLevel that is marked as "NotMatched" to the hash value of the corresponding node of SHT. Each child node of each RHT node in the CurrentLevel that is marked as "NotMatched" that has a hash value that does not match the hash value of the corresponding node of SHT is marked as "NotMatched."

At step 612, CurrentLevel is set as equal to CurrentLevel+1. In other words, the process 600 goes down a level in the RHT. The process 600 then returns to decision step 608 and proceeds as outlined above.

Returning again to decision step 608, if it is determined that CurrentLevel is equal to the leaf level, then the process 600 proceeds to block 614 wherein for each RHT node at the leaf level that is marked as "NotMatched," a corresponding content block associated with that node is identified. The process 600 then proceeds to block 616, wherein information indicating that resultant hash value from the decrypted digital signature of the received content did not match the second hash value of the second root nod of RHT is outputted. In some embodiments, this can include outputting information identifying the one or more content blocks identified in block 614 as being potentially corrupted and the cause of the signature mismatch.

Figure 7:
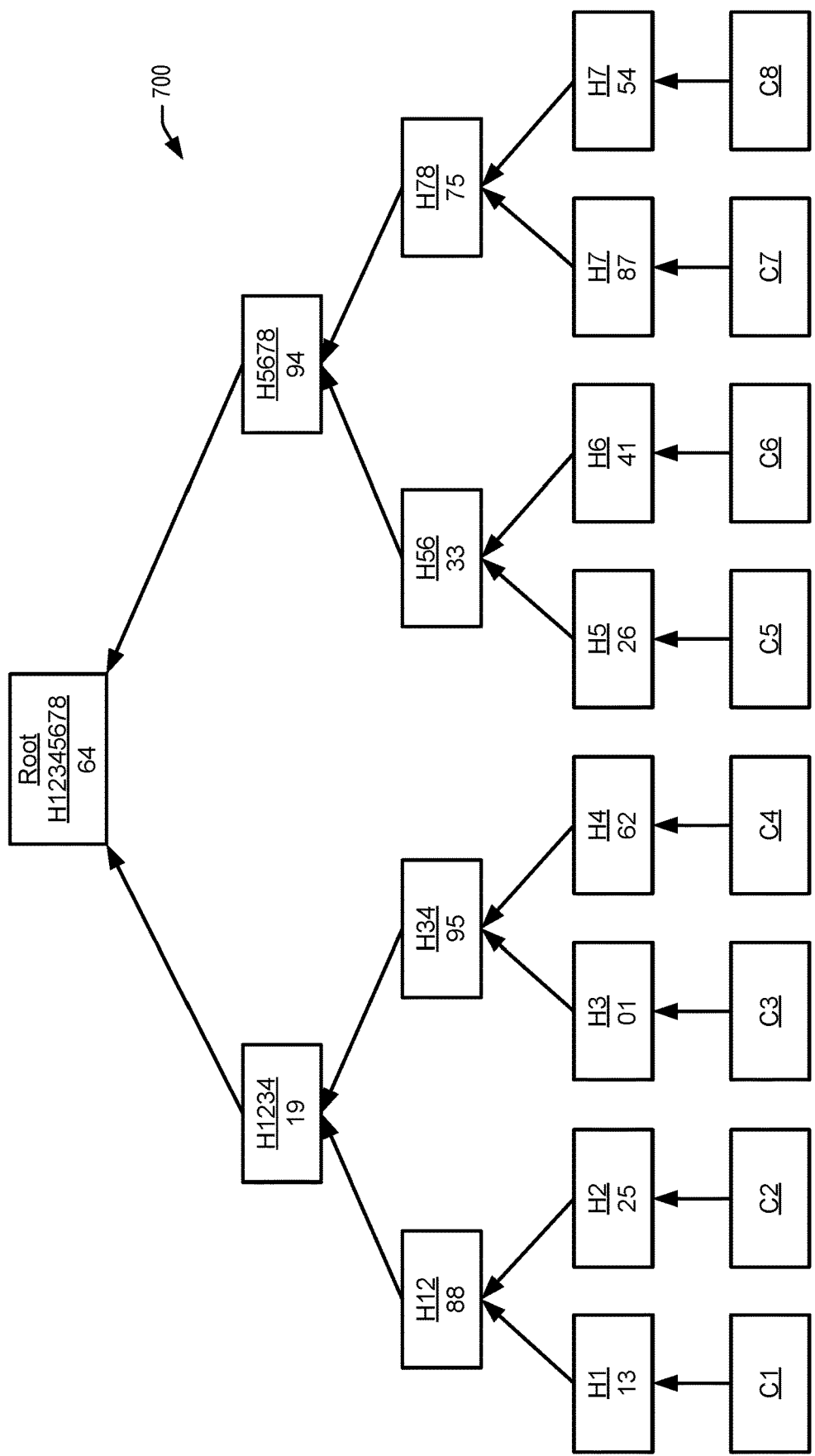
FIG. 7 is a depiction of one exemplary embodiment of hash tree SHT.
Figure 8:
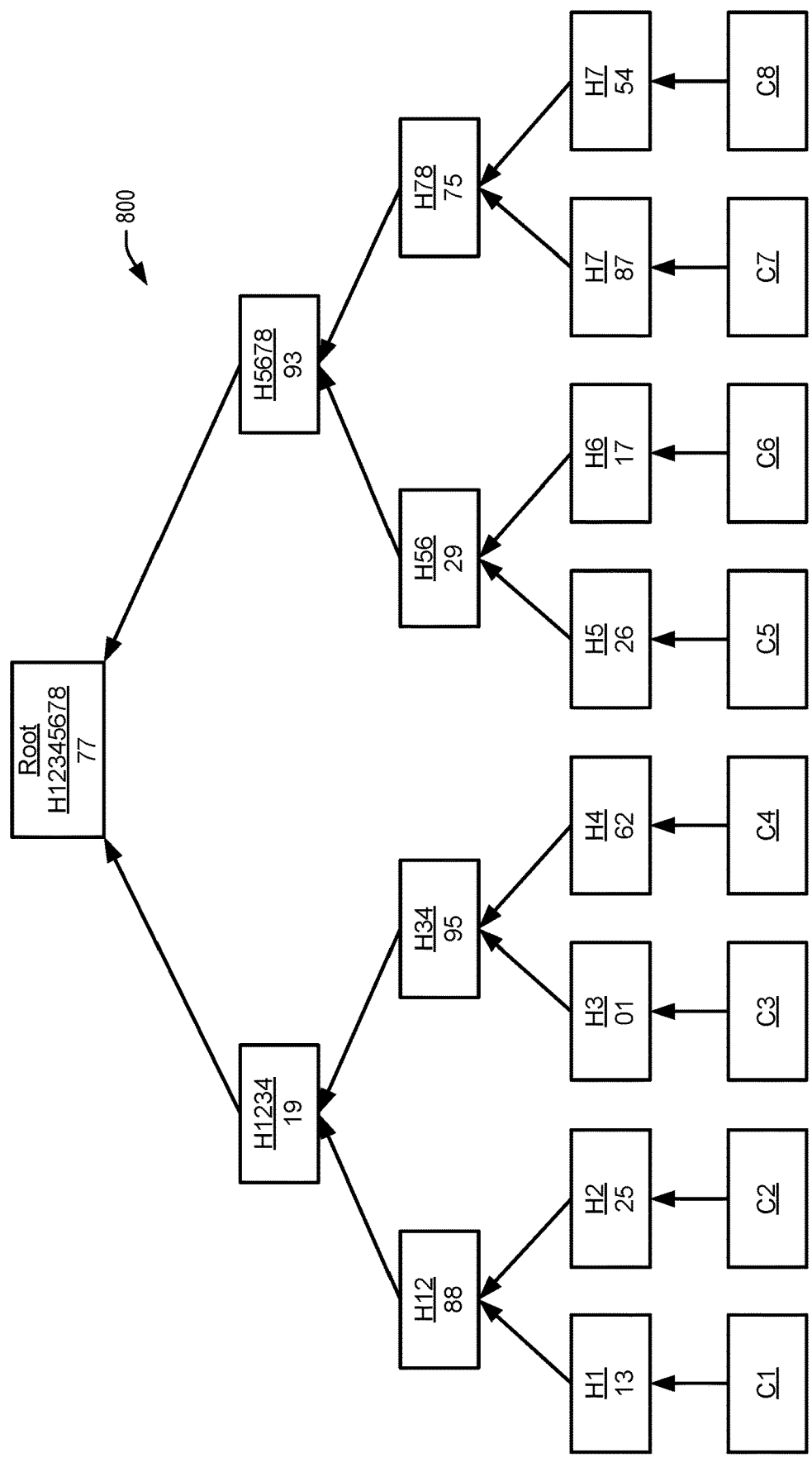
FIG. 8 is a depiction of one exemplary embodiment of hash tree RHT.

With reference now to FIG. 7, an example of one embodiment of SHT 700 is shown, and with reference now to FIG. 8, and example of one embodiment of RHT 800 is shown. The comparison of the resultant hash value to the second hash value of the second root node, H12345678 may indicates a mismatch, more specifically, the first hash value 64 is not equal to the second hash value 77. Dropping a level from the root nodes, nodes H1234 and H5678 of RHT and SHT can be compared. As seen, the hash value, 93, of H5678 in RHT does not match the hash value, 94, of H5678 in SHT. A subtree can be identified within RHT having H5678 as root node of the subtree. The subtree of H1234 can be ignored or left out of further evaluation as the hash value of H1234 of SHT match the hash value of H1234 of RHT.

Dropping a level within the subtree of RHT having H5678 as root node, nodes H56 and H78 of SHT and RHT can be compared. As seen, the hash value, 33, of H56 of SHT does not match the hash value, 29, of H56 of RHT. A subtree can be identified within RHT having H56 as root node of the subtree. The subtree having age 78 as root node can be ignored or left out of further evaluation as the hash value of H78 in SHT matches the hash value of H78 in RHT.

Dropping a level within the subtree of RHT having H56 as root node, nodes H5 and H6 of SHT and RHT can be compared. As seen, the hash value, 41, of H6 of SHT does not match the hash value, 17, of H6 of RHT. As H6 is a leaf node, the content block, C6, corresponding to H6 can be identified. Outputs as discussed in block 616 can be provided, which outputs can indicate a mismatch between the resultant value from the decrypted digital signature and the hash value of the root node of RHT, and can indicate and/or identify the one or several content blocks, or in this case, C6, identified as potentially corrupted and as the potential cause of the signature mismatch.

Example Implementation

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
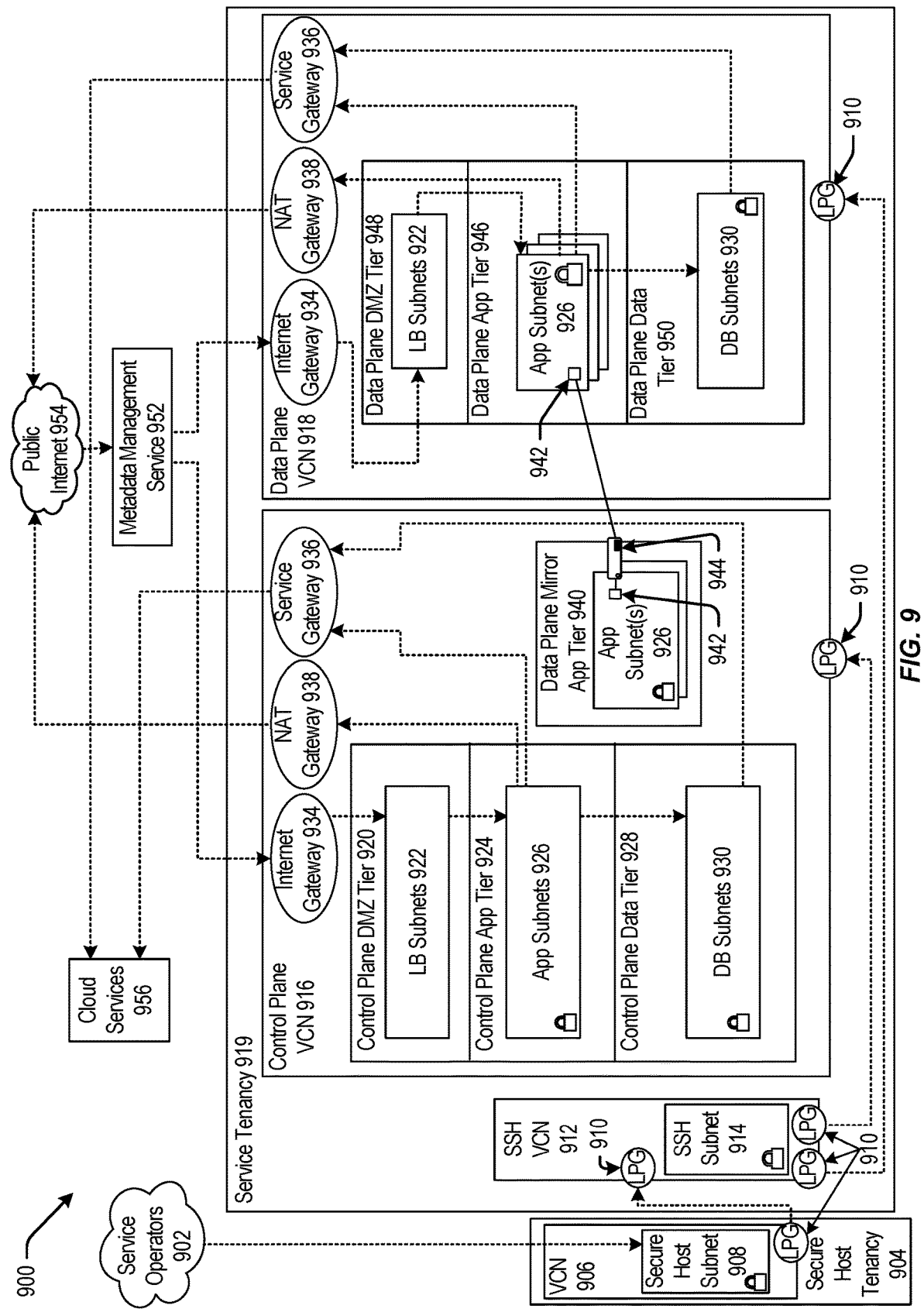
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep security breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN @116, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plan VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of security, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
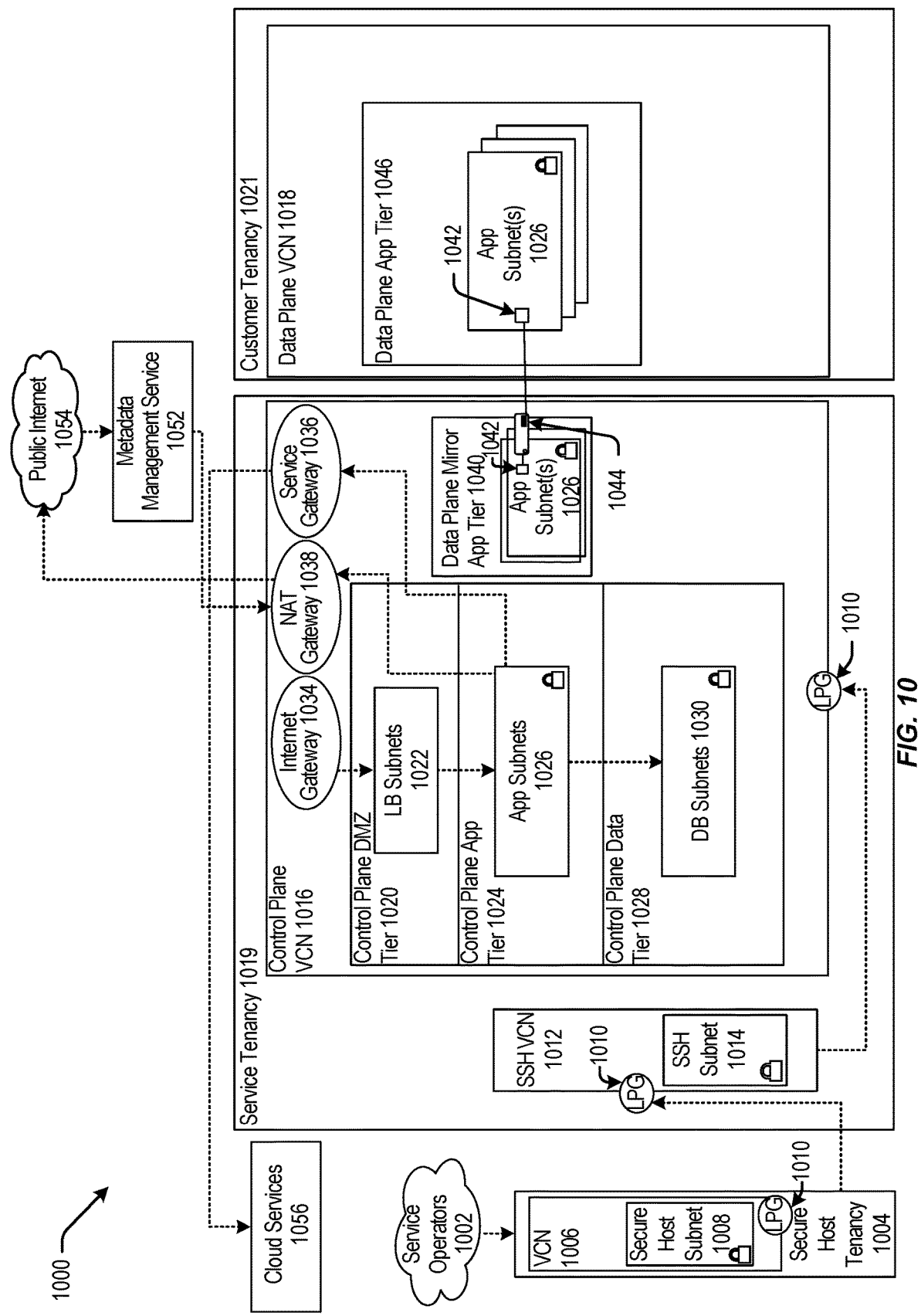
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plan app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment @1," may be located in Region 1 and in "Region 2." If a call to Deployment @1 is made by the service gateway 1036 contained in the control plane VCN 1016 located in Region 1, the call may be transmitted to Deployment @1 in Region 1. In this example, the control plane VCN 1016, or Deployment @1 in Region 1, may not be communicatively coupled to, or otherwise in communication with, Deployment @1 in Region 2.

Figure 11:
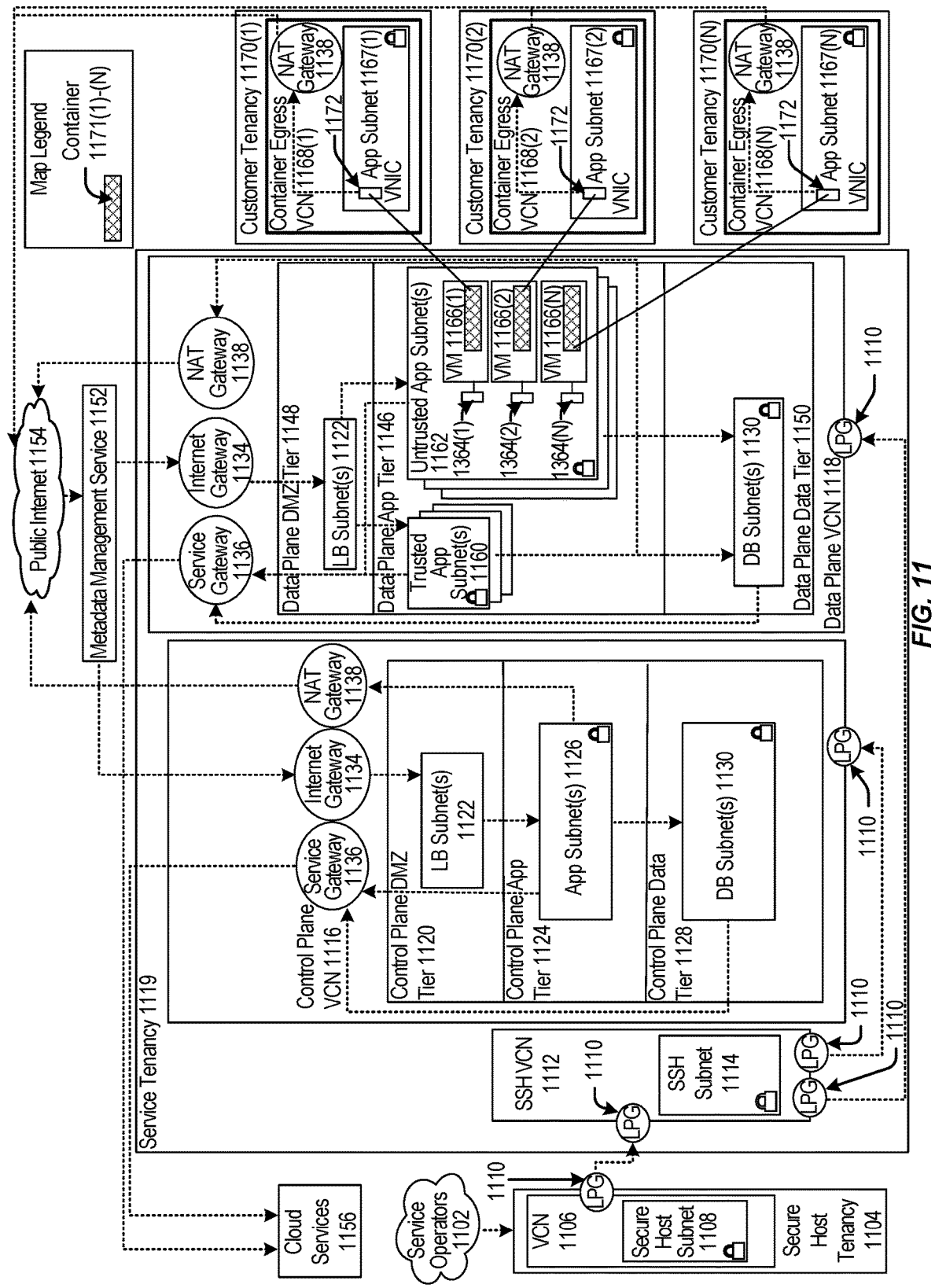
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g. the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
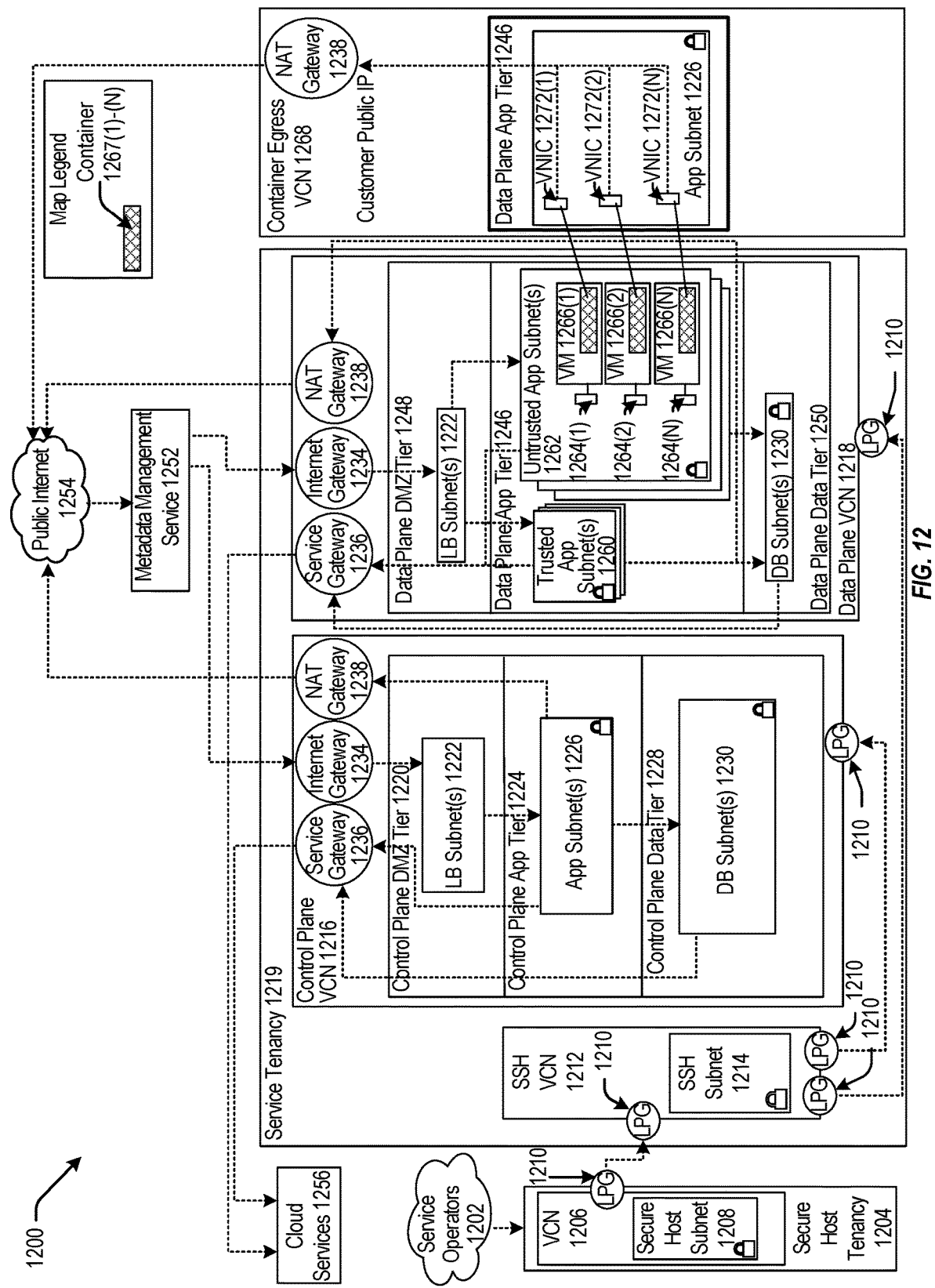
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN) 1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
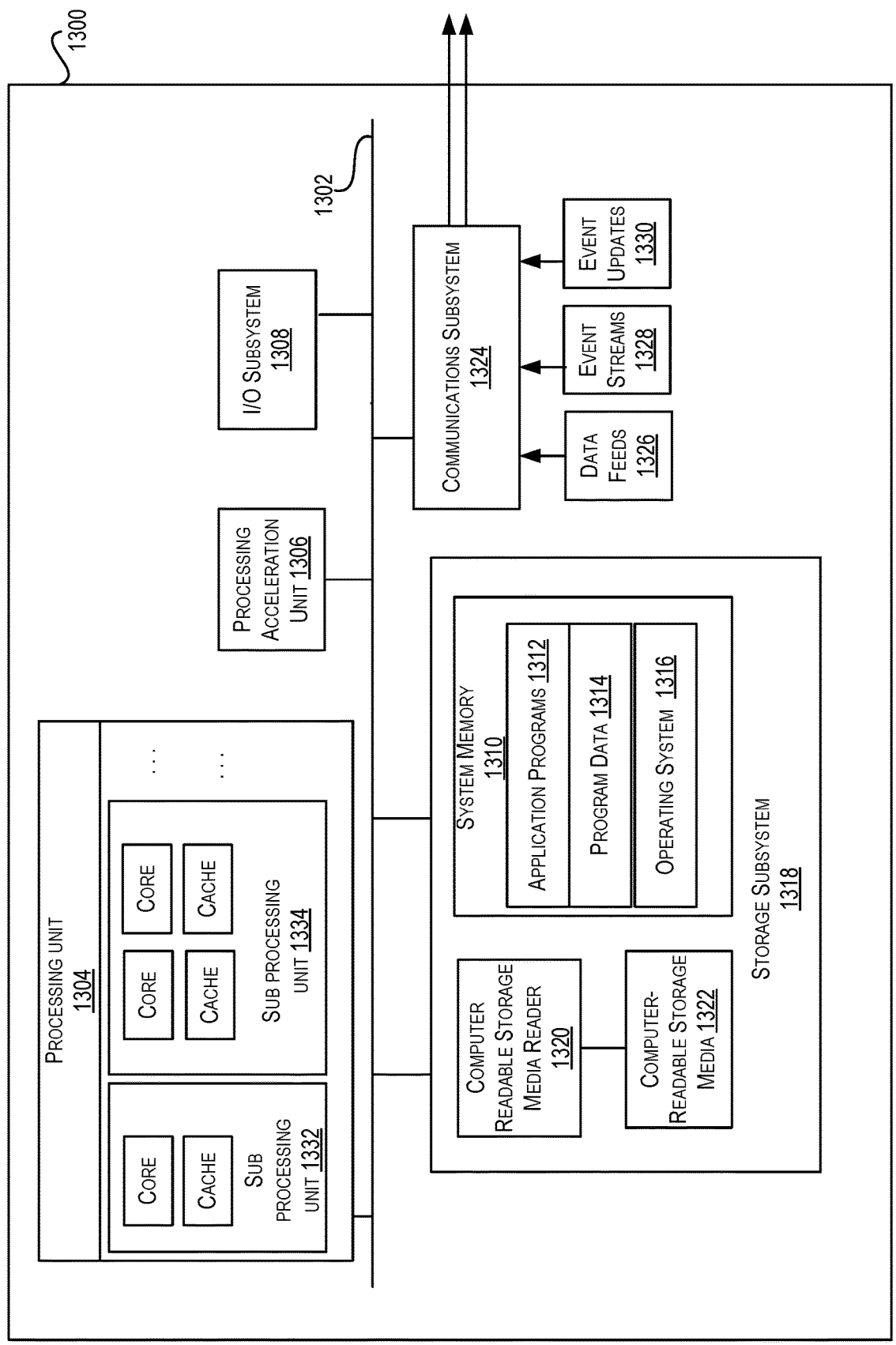
FIG. 13 is a block diagram illustrating an example computer system, according to at least one embodiment.

FIG. 13 illustrates an example computer system 1300, in which various embodiments of the present disclosure may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 13 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MARM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments.

Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving at a recipient system from a sender system transmitted content (C) and appended content, the appended content comprising a digital signature associated with the content (C) and a hash tree ("SHT") associated with the content (C) and comprising a plurality of first nodes and a first root node;
   authenticating the digital signature based on a hash tree ("RHT"), wherein RHT is generated by the recipient system with content (C), wherein authenticating the digital signature based on RHT comprises comparing a resultant hash generated from the digital signature to a particular hash value generated based on at least a portion of RHT;
   identifying a potentially corrupted portion of content (C) based on a comparison of at least portions of SHT with at least portions of RHT; and
   indicating that the content (C) could not be verified.

2. The method of claim 1, wherein RHT is generated with a signature engine of the recipient system, wherein RHT comprises a plurality of second nodes and a second root node having the particular hash, and wherein authenticating the digital signature based on RHT comprises:
   cryptographically verifying the received digital signature to generate the resultant hash value;
   determining that the particular hash value of the second root node does not match the resultant hash value; and
   identifying a potentially corrupted portion of content (C) via comparison of at least some of the plurality of first nodes of SHT to corresponding second nodes of RHT.

3. The method of claim 2, wherein the signature engine comprises: an overlay subsystem; and an underlay subsystem.

4. The method of claim 3, wherein the overlay subsystem is configured to generate RHT, and wherein the underlay subsystem is configured to store the content (C).

5. The method of claim 4, wherein the received digital signature is cryptographically verified with a public key of the sender.

6. The method of claim 4, wherein the first root node comprises a first hash value, and wherein the resultant hash value matches to the first hash value.

7. The method of claim 4, wherein generating RHT comprises:
determining a block size for demarcation of content (C); and
demarcating content (C) according to the determined block size.

8. The method of claim 7, wherein demarcating content (C) according to the determined block size comprises constructing a demarcation map comprising an array of values identifying a starting byte and an ending byte for each block of demarcated content (C).

9. The method of claim 8, wherein generating RHT further comprises: computing a leaf hash value for each demarcated block of content (C).

10. The method of claim 9, wherein computing the leaf hash value for each demarcated block of content (C) comprises, for each demarcated block of content (C):
selecting a demarcated block of content (C);
identifying the starting byte and the ending byte in content (C) corresponding to the demarcated block of content (C); and
generating a bitwise copy of the content (C) corresponding to the demarcated block of content (C).

11. The method of claim 10, wherein computing the leaf hash value for each demarcated block of content (C) comprises, for each demarcated block of content (C):
applying a hash function to the bitwise copy of the content (C) corresponding to the demarcated block of content (C), wherein the output of the hash function applied to the bitwise copy of the content (C) corresponding to one of the demarcated blocks of content (C) is the leaf hash value of that one of the demarcated blocks of content (C).

12. The method of claim 11, wherein applying the hash function to the bitwise copy of the content (C) corresponding to the demarcated block of content (C) for each demarcated block of content (C) comprises a single-threaded process.

13. The method of claim 11, further comprising applying a multithreaded process to applying the hash function to the bitwise copy of the content (C) corresponding to the demarcated block of content (C) for each demarcated block of content (C) when available memory is a multiple of block size, wherein the multiple is at least two.

14. The method of claim 13, wherein applying the hash function to the bitwise copy of the content (C) corresponding to the demarcated block of content (C) for each demarcated block of content (C) comprises a multi-threaded process.

15. The method of claim 11, wherein the hash function is SHA256.

16. The method of claim 11, wherein generating RHT comprises iteratively:
identifying a pair of adjacent child nodes;
concatenating the pair of child nodes; and
applying the hash function to the concatenation of the pair of child nodes.

17. The method of claim 16, wherein the pair of child nodes are leaf nodes, wherein each of the leaf nodes comprises one of the leaf hash values.

18. The method of claim 2, further comprising:
outputting information identifying portions of content (C) as potentially corrupted.

19. A non-transitory computer-readable storage-medium storing a plurality of instructions executable by one or more processors, the plurality of instructions when executed by the one or more processors cause the one or more processors to:
receive at a recipient system from a sender system transmitted content (C) and appended content, the appended content comprising a digital signature associated with the content (C) and a hash tree ("SHT") associated with the content (C) and comprising a plurality of first nodes and a first root node;
authenticate the digital signature based on a hash tree ("RHT"), wherein RHT is generated by the recipient system with content (C), wherein authenticating the digital signature based on RHT comprises comparing a resultant hash generated from the digital signature to a particular hash value generated based on at least a portion of RHT;
identify a potentially corrupted portion of content (C) based on a comparison of at least portions of SHT with at least portions of RHT; and
indicate that the content (C) could not be verified.

20. A system comprising:
a memory comprising a public key for cryptographically verifying a received digital signature; and
a processor configured to:
receive transmitted content (C) and appended content, the appended content comprising a digital signature associated with the content (C) and a hash tree ("SHT") associated with the content (C) and comprising a plurality of first nodes and a first root node;
authenticate the digital signature based on a hash tree ("RHT"), wherein RHT is generated by the processor with content (C), wherein authenticating the digital signature based on RHT comprises comparing a resultant hash generated from the digital signature to a particular hash value generated based on at least a portion of RHT;
identify a potentially corrupted portion of content (C) based on a comparison of at least portions of SHT with at least portions of RHT; and
indicate that the content (C) could not be verified.

* * * * *